United States Patent
Fan et al.

(10) Patent No.: US 11,146,469 B2
(45) Date of Patent: *Oct. 12, 2021

(54) PACKET LOSS DETECTION METHOD, APPARATUS, AND SYSTEM

(71) Applicant: HUAWEI TECHNOLOGIES CO., LTD., Guangdong (CN)

(72) Inventors: Duoliang Fan, Nanjing (CN); Binxuan Li, Beijing (CN); Haotao Pan, Nanjing (CN); Heyang Liu, Nanjing (CN); Jinfeng Yan, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,574

(22) Filed: Mar. 18, 2019

(65) Prior Publication Data

US 2019/0306039 A1    Oct. 3, 2019

Related U.S. Application Data

(63) Continuation of application No. 15/173,539, filed on Jun. 3, 2016, now Pat. No. 10,237,252.

(30) Foreign Application Priority Data

Jun. 3, 2015   (CN) .......................... 201510299294.7

(51) Int. Cl.
*H04L 12/26* (2006.01)
*H04L 12/801* (2013.01)
(Continued)

(52) U.S. Cl.
CPC ........ *H04L 43/0829* (2013.01); *H04L 43/026* (2013.01); *H04L 43/04* (2013.01);
(Continued)

(58) Field of Classification Search
None
See application file for complete search history.

(56) References Cited

U.S. PATENT DOCUMENTS

| 8,649,285 B2 * | 2/2014 | Fuchs | H04L 43/50 370/252 |
| 9,292,397 B1 * | 3/2016 | Kleyman | G06F 11/221 |

(Continued)

FOREIGN PATENT DOCUMENTS

| CN | 102404170 A | 4/2012 |
| EP | 2903214 A1 | 8/2015 |

(Continued)

OTHER PUBLICATIONS

Y. Li et al. Trill: Data Label based Tree Selection for Multi-destination Data, draft-ietf-trill-tree-selection-00, Apr. 21, 2015. 18 pages.

(Continued)

*Primary Examiner* — Jutai Kao
(74) *Attorney, Agent, or Firm* — Leydig, Voit & Mayer, Ltd.

(57) ABSTRACT

Embodiments of the present disclosure relate to the field of communications technologies and disclose a packet loss detection method, an apparatus, and a system. The method includes: collecting, by a first network device according to packets sent to a second network device, statistics on a first result corresponding to each group of packets, one first result includes a quantity of packets in one group of packets and a section identifier of the group of packets, each group of packets includes multiple packets, and multiple packets are continuously sent by first network device and belong to a section corresponding to a section identifier of the group of packet; sending, by first network device, first result corresponding to each group of packets to a controller according
(Continued)

to a preset rule, so that controller determines whether a packet in the packets sent by first network device to second network device is lost.

12 Claims, 4 Drawing Sheets

(51) Int. Cl.
 *H04L 12/939* (2013.01)
 *H04L 29/06* (2006.01)
(52) U.S. Cl.
 CPC ............ *H04L 47/34* (2013.01); *H04L 49/552* (2013.01); *H04L 69/16* (2013.01)

(56) References Cited

U.S. PATENT DOCUMENTS

| | | | |
|---|---|---|---|
| 10,237,152 B2* | 3/2019 | Fan | H04L 43/04 |
| 2009/0010158 A1 | 1/2009 | Filsfils et al. | |
| 2009/0022065 A1 | 1/2009 | Chen et al. | |
| 2011/0255440 A1 | 10/2011 | Cociglio et al. | |
| 2013/0021169 A1* | 1/2013 | Soomro | G06F 19/3418 |
| | | | 340/870.02 |
| 2015/0071096 A1* | 3/2015 | Hayden | H04L 69/14 |
| | | | 370/252 |
| 2015/0117234 A1* | 4/2015 | Raman | H04L 43/0829 |
| | | | 370/252 |
| 2015/0222444 A1* | 8/2015 | Sarkar | H04L 12/1877 |
| | | | 370/390 |
| 2015/0304185 A1* | 10/2015 | Frost | H04L 43/106 |
| | | | 370/252 |
| 2016/0013892 A1 | 1/2016 | Suzuki | |
| 2016/0191400 A1 | 6/2016 | Sreeramoju et al. | |
| 2017/0134123 A1* | 5/2017 | Ozturk | H04W 28/0205 |

FOREIGN PATENT DOCUMENTS

| | | |
|---|---|---|
| JP | 2014502441 A | 1/2014 |
| JP | 2014160899 A | 9/2014 |
| KR | 20130093647 A | 8/2013 |
| WO | 2010072251 A1 | 7/2010 |
| WO | 2012059138 A1 | 5/2012 |
| WO | 2014048137 A1 | 4/2014 |

OTHER PUBLICATIONS

RFC: 791. Internet Protocol, DARPA Internet Program, Protocol Specification, Sep. 1981. 50 pages.
XP015105105. A. Capello et al.: "A packet based method for passive performance monitoring,draft-tempia-ippm-p3m-00.txt",Mar. 5, 2015, pp. 1-21.
XP015081292, D Frost et al. :Packet Loss and Delay Measurement for MPLS Networks; rfc6374. Sep. 2011. 52 pages.
XP015095548. M. Chen et al: Coloring based IP Flow Performance Measurement Framework;draft-chen-ippm-coloring-based-ipfpm-frame work-01. Oct. 21, 2013, pp. 1-23.
XP017578457, ITU-T G.8013/Y.1731 Series G: Transmission Systems and Media, Digital Systems and Networks Packet over Transport aspects—Ethernet over Transport aspects Series Y: Global Information Infrastructure, Internet Protocol Aspects and Next-Generation Networks Internet protocol aspects—Operation, administration and maintenance, OAM functions and mechanisms for Ethernet based networks, Telecommunication Standardization Sector of ITU, Jul. 22, 2011, pp. 1-92.
RFC6375. D. Frost, Ed et al. A Packet Loss and Delay Measurement Profilefor MPLS-Based Transport Networks, Sep. 2011. 5 pages.

* cited by examiner

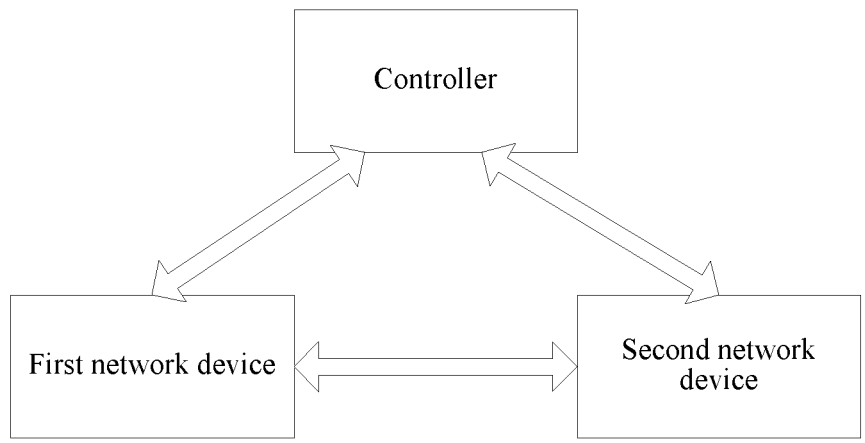
FIG. 1
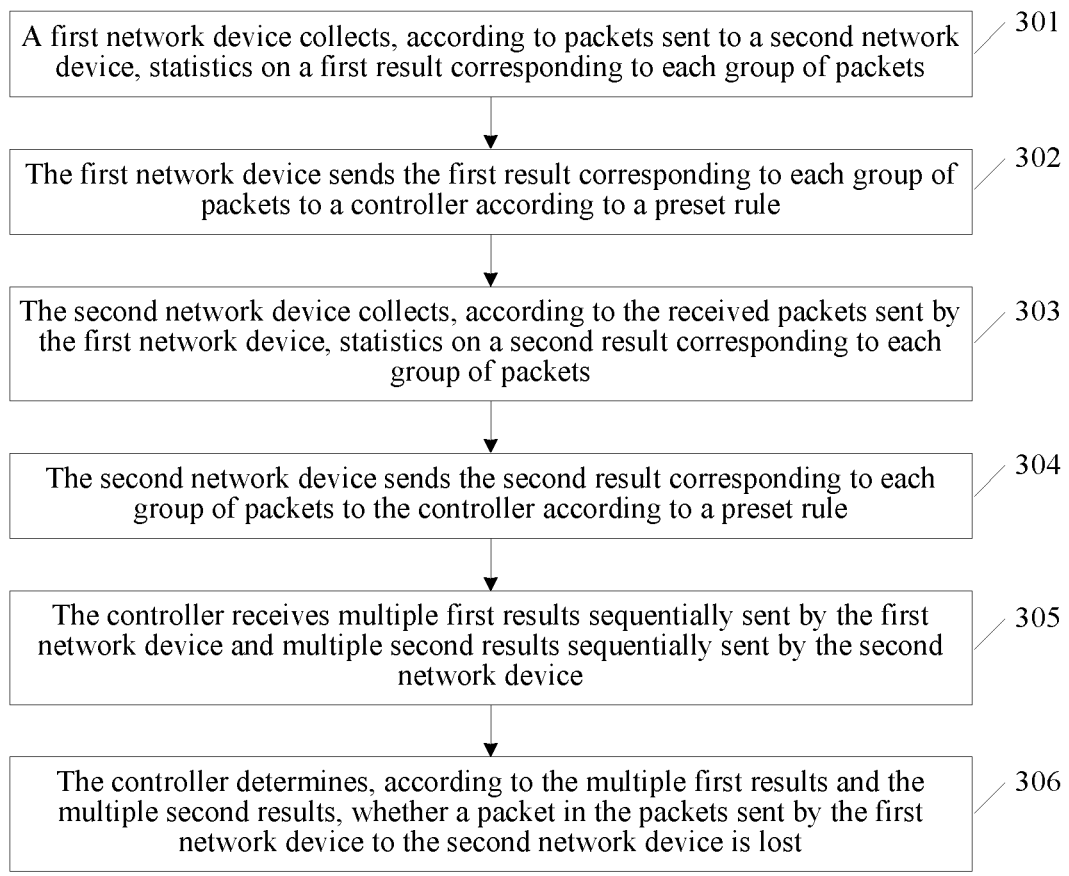
FIG. 2
FIG. 3

PACKET LOSS DETECTION METHOD, APPARATUS, AND SYSTEM

CROSS REFERENCE TO RELATED APPLICATIONS

This application is a continuation of U.S. patent application Ser. No. 15/173,539, filed on Jun. 3, 2016, which claims priority to Chinese Patent Application No. 201510299294.7, filed on Jun. 3, 2015. The afore-mentioned patent applications are hereby incorporated by reference in their entireties.

TECHNICAL FIELD

The present disclosure relates to the field of communications technologies, and in particular, to a packet loss detection method, an apparatus, and a system.

BACKGROUND

With rapid development of Internet, an Internet Protocol (English: Internet Protocol, IP for short) network has become a cornerstone for information bearing. In an IP network, network devices communicate with each other by transmitting data packets. However, a transmit end network device does not detect whether a receive end network device has received the data packet. In this case, if the data packet is lost, experience of a user using the network device degrades (for example, when a user watches a video by using the network device, an IP service packet corresponding to a video service is lost, and consequently a video image cannot be displayed normally). Therefore, it may be determined, by detecting whether a data packet is lost, whether a fault occurs on the network, so as to maintain the network in time.

Currently, when a network device 1 sends an IP service packet to a network device 2, the network device 1 may determine, together with the network device 2 by inserting a statistics collection packet into the IP service packet, whether the IP service packet is lost. As shown in FIG. 1, for an IP service stream sent to the network device 1, a statistics collection packet A and a statistics collection packet B are inserted into a service packet of the IP service stream, where the statistics collection packet A records a quantity TX1 of IP service packets that are sent by the network device 1 before the network device 1 sends the statistics collection packet A. The statistics collection packet B records a quantity TX2 of IP service packets that are sent by the network device 1 before the network device 1 sends the statistics collection packet B. When receiving the statistics collection packet A, the network device 2 records a quantity RX1 of IP service packets that are received by the network device 2 before this moment. When receiving the statistics collection packet B, the network device 2 records a quantity RX2 of IP service packets that are received by the network device 2 before this moment. The network device 2 determines whether RX2-RX1 is equal to TX2-TX1. If RX2-RX1 is equal to TX2-TX1, it indicates that the IP service packet between the statistics collection packet A and the statistics collection packet B is not lost. Otherwise, the IP service packet is lost.

When the foregoing method is used to detect whether an IP service packet is lost, a statistics collection packet should be inserted between adjacent IP service packets and then is sent. The statistics collection packet is information on a control plane and the IP service packet is information on a data plane. Therefore, in order to achieve that the statistics collection packet is sent on a data plane and a existed sequence between the statistics collection packet and the IP service packet is maintained, an implementation process is relatively complex, and even, some network devices do not have the function, and cannot detect, by using the method, whether an IP service packet is lost.

SUMMARY

Embodiments of the present disclosure provide a packet loss detection method, an apparatus, and a system, so as to simplify a process of a packet loss detection method.

To achieve the foregoing objective, the following technical solutions are used in the embodiments of the present disclosure:

According to a first aspect, a packet loss detection method is provided, including:

collecting, by a first network device according to packets sent to a second network device, statistics on a first result corresponding to each group of packets, where one first result includes a quantity of packets in one group of packets and a section identifier of the group of packets, each group of packets includes multiple packets, and the multiple packets are continuously sent by the first network device and belong to a section corresponding to a section identifier of the group of packets; and sending, by the first network device, the first result corresponding to each group of packets to a controller according to a preset rule, so that the controller determines whether a packet in the packets sent by the first network device to the second network device is lost.

With reference to the first aspect, in a first possible implementation manner, packets whose Identifier fields in packet headers fall within a same numerical range or packets whose at least one bit in Identifier fields in packet headers share a same value belong to a same section.

With reference to the first aspect or the first possible implementation manner of the first aspect, in a second possible implementation manner, a time of the first network device is synchronized with a time of the second network device;

the collecting, by a first network device according to packets sent to a second network device, statistics on a first result corresponding to each group of packets includes:

periodically collecting, by the first network device according to the packets sent to the second network device, statistics on the first result corresponding to each group of packets, to obtain a first result group corresponding to each period, where one first result group includes an identifier of one period and first results corresponding to one or more groups of packets obtained by the first network device through statistics collection within the period; and the sending, by the first network device, the first result corresponding to each group of packets to a controller according to a preset rule includes:

sending, by the first network device, the first result group to the controller according to the preset rule.

According to a second aspect, a packet loss detection method is provided, including:

collecting, by a second network device according to received packets sent by a first network device, statistics on a second result corresponding to each group of packets, where one second result includes a quantity of packets in one group of packets and a section identifier of the group of packets, each group of packets includes multiple packets, and the multiple packets are continuously received by the second network device and belong to a section corresponding to a section identifier of the group of packets; and sending, by the second network device, the second result corresponding to each group of packets to a controller according to a preset rule, so that the controller determines whether a packet in the packets sent by the first network device to the second network device is lost.

With reference to the second aspect, in a first possible implementation manner, packets whose Identifier fields in packet headers fall within a same numerical range or packets whose at least one bit in Identifier fields in packet headers share a same value belong to a same section.

With reference to the second aspect or the first possible implementation manner of the second aspect, in a second possible implementation manner, a time of the second network device is synchronized with a time of the first network device;

the collecting, by a second network device according to received packets sent by a first network device, statistics on a second result corresponding to each group of packets includes:

periodically collecting, by the second network device according to the received packets sent by the first network device, statistics on the second result corresponding to each group of packets, to obtain a second result group corresponding to each period, where one second result group includes an identifier of one period and second results corresponding to one or more groups of packets obtained by the second network device through statistics collection within the period; and the sending, by the second network device, the second result corresponding to each group of packets to a controller according to a preset rule includes:

sending, by the second network device, the second result group to the controller according to the preset rule.

According to a third aspect, a packet loss detection method is provided, including:

receiving, by a controller, multiple first results sequentially sent by a first network device and multiple second results sequentially sent by a second network device, where one first result includes a quantity of packets in one group of packets obtained by the first network device through statistics collection according to packets sent to the second network device and includes a section identifier of the group of packets, each group of packets sent by the first network device includes multiple packets that are continuously sent by the first network device and belong to a section corresponding to a section identifier of the group of packets, one second result includes a quantity of packets in one group of packets obtained by the second network device through statistics collection according to the received packets sent by the first network device and includes a section identifier of the group of packets, and each group of packets received by the second network device includes multiple packets that are continuously received by the second network device and belong to a section corresponding to a section identifier of the group of packets; and determining, by the controller according to the multiple first results and the multiple second results, whether a packet in the packets sent by the first network device to the second network device is lost.

With reference to the third aspect, in a first possible implementation manner, packets whose Identifier fields in packet headers fall within a same numerical range or packets whose at least one bit in Identifier fields in packet headers share a same value belong to a same section.

With reference to the third aspect or the first possible implementation manner of the third aspect, in a second possible implementation manner, the determining, by the controller according to the multiple first results and the multiple second results, whether a packet in the packets sent by the first network device to the second network device is lost includes:

determining, by the controller, a first result used as a reference and a second result used as a reference, where the first result used as the reference and the second result used as the reference correspond to a same group of packets; and comparing, by the controller, the sequentially received multiple first results started from the first result used as the reference with the sequentially received multiple second results started from the second result used as the reference, and when quantities of packets included in a first result and a second result that correspond to a same group of packets are different, determining that a packet in the packets sent by the first network device to the second network device is lost.

With reference to the second possible implementation manner of the third aspect, in a third possible implementation manner, the determining, by the controller, a first result used as a reference and a second result used as a reference includes:

comparing, by the controller, Q consecutive first results with multiple second results, and when each first result of the Q consecutive first results is the same as a corresponding second result of Q consecutive second results, determining, by the controller, the last one of the Q consecutive first results as the first result used as the reference and determining the last one of the Q consecutive second results as the second result used as the reference, where the Q second results belong to the multiple second results and the $q^{th}$ first result of the Q first results corresponds to the $q^{th}$ second result of the Q second results, where $1 \leq q \leq Q$ and both q and Q are integers.

With reference to the third aspect, in a fourth possible implementation manner, a time of the first network device is synchronized with a time of the second network device;

the receiving, by a controller, multiple first results sequentially sent by a first network device and multiple second results sequentially sent by a second network device includes:

receiving, by the controller, multiple first result groups sequentially sent by the first network device and multiple second result groups sequentially sent by the second network device, where one first result group includes an identifier of one period and first results corresponding to one or more groups of packets obtained by the first network device through statistics collection within the period, and one second result group includes an identifier of one period and second results corresponding to one group or multiple groups of packets obtained by the second network device through statistics collection within the period; and the determining, by the controller according to the multiple first results and the multiple second results, whether a packet in the packets sent by the first network device to the second network device is lost includes:

determining, by the controller according to the multiple first result groups and the multiple second result groups, whether a packet in the packets sent by the first network device to the second network device is lost.

With reference to the fourth possible implementation manner of the third aspect, in a fifth possible implementation manner, the determining, by the controller according to the multiple first result groups and the multiple second result groups, whether a packet in the packets sent by the first network device to the second network device is lost includes:

comparing, by the controller, a first result in a first result group with a corresponding second result in a second result group, where the first result group and the second result group have an identifier of a same period, and when any comparison result indicates that a first result is different from a second result, determining that a packet in the packets sent by the first network device to the second network device is lost, where when either quantities or section identifiers included in a first result and a second result that are compared are different, the comparison result indicates that the first result is different from the second result; and the $p^{th}$ first result in the first result group corresponds to the $p^{th}$ second result in the second result group, where $p \geq 1$ and p is an integer.

With reference to the third aspect or any one of the first to the third possible implementation manners of the third aspect, in a sixth possible implementation manner, before the determining, by the controller according to the multiple first results and the multiple second results, whether a packet in the packets sent by the first network device to the second network device is lost, the method further includes:

when the section identifier is values of multiple bits of an Identifier field in a packet header, sequencing, by the controller, the multiple second results, so that section identifiers of the sequenced multiple second results are in ascending order, where the determining, by the controller according to the multiple first results and the multiple second results, whether a packet in the packets sent by the first network device to the second network device is lost includes:

determining, by the controller according to the multiple first results and the sequenced multiple second results, whether a packet in the packets sent by the first network device to the second network device is lost.

According to a fourth aspect, a network device is provided, including:

a statistics collection unit, configured to collect, according to packets sent to another network device, statistics on a first result corresponding to each group of packets, where one first result includes a quantity of packets in one group of packets and a section identifier of the group of packets, each group of packets includes multiple packets, and the multiple packets are continuously sent by the network device and belong to a section corresponding to a section identifier of the group of packets; and a sending unit, configured to send the first result corresponding to each group of packets to a controller according to a preset rule, so that the controller determines whether a packet in the packets sent by the network device to the another network device is lost.

With reference to the fourth aspect, in a first possible implementation manner, packets whose Identifier fields in packet headers fall within a same numerical range or packets whose at least one bit in Identifier fields in packet headers share a same value belong to a same section.

With reference to the fourth aspect or the first possible implementation manner of the fourth aspect, in a second possible implementation manner, a time of the network device is synchronized with a time of the another network device;

the statistics collection unit is further configured to periodically collect, according to the packets sent to the another network device, statistics on the first result corresponding to each group of packets, to obtain a first result group corresponding to each period, where one first result group includes an identifier of one period and first results corresponding to one or more groups of packets obtained by the network device through statistics collection within the period; and the sending unit is further configured to send the first result group to the controller according to the preset rule.

According to a fifth aspect, a network device is provided, including:

a statistics collection unit, configured to collect, according to received packets sent by another network device, statistics on a second result corresponding to each group of packets, where one second result includes a quantity of packets in one group of packets and a section identifier of the group of packets, each group of packets includes multiple packets, and the multiple packets are continuously received by the network device and belong to a section corresponding to a section identifier of the group of packets; and a sending unit, configured to send the second result corresponding to each group of packets to a controller according to a preset rule, so that the controller determines whether a packet in the packets sent by the another network device to the network device is lost.

With reference to the fifth aspect, in a first possible implementation manner, packets whose Identifier fields in packet headers fall within a same numerical range or packets whose at least one bit in Identifier fields in packet headers share a same value belong to a same section.

With reference to the fifth aspect or the first possible implementation manner of the fifth aspect, in a second possible implementation manner, a time of the network device is synchronized with a time of the another network device;

the statistics collection unit is further configured to periodically collect, according to the received packets sent by the another network device, statistics on the second result corresponding to each group of packets, to obtain a second result group corresponding to each period, where one second result group includes an identifier of one period and second results corresponding to one or more groups of packets obtained by the network device through statistics collection within the period; and the sending unit is further configured to send the second result group to the controller according to the preset rule.

According to a sixth aspect, a controller is provided, including:

a receiving unit, configured to receive multiple first results sequentially sent by a first network device and multiple second results sequentially sent by a second network device, where one first result includes a quantity of packets in one group of packets obtained by the first network device through statistics collection according to packets sent to the second network device and includes a section identifier of the group of packets, each group of packets sent by the first network device includes multiple packets that are continuously sent by the first network device and belong to a section corresponding to a section identifier of the group of packets, one second result includes a quantity of packets in one group of packets obtained by the second network device through statistics collection according to the received packets sent by the first network device and includes a section identifier of the group of packets, and each group of packets received by the second network device includes multiple packets that are continuously received by the second network device and belong to a section corresponding to a section identifier of the group of packets; and a determining unit, configured to determine, according to the multiple first results and the multiple second results, whether a packet in the packets sent by the first network device to the second network device is lost.

With reference to the sixth aspect, in a first possible implementation manner, packets whose Identifier fields in packet headers fall within a same numerical range or packets whose at least one bit in Identifier fields in packet headers share a same value belong to a same section.

With reference to the sixth aspect or the first possible implementation manner of the sixth aspect, in a second possible implementation manner, the determining unit includes:

a first determining subunit, configured to determine a first result used as a reference and a second result used as a reference, where the first result used as the reference and the second result used as the reference correspond to a same group of packets; and a second determining subunit, configured to compare the sequentially received multiple first results started from the first result used as the reference with the sequentially received multiple second results started from the second result used as the reference, and when quantities of packets included in a first result and a second result that correspond to a same group of packets are different, determine that a packet in the packets sent by the first network device to the second network device is lost.

With reference to the second possible implementation manner of the sixth aspect, in a third possible implementation manner, the first determining subunit is specifically configured to:

compare Q consecutive first results with multiple second results, and when each first result of the Q consecutive first results is the same as a corresponding second result of Q consecutive second results, determine the last one of the Q consecutive first results as the first result used as the reference and determine the last one of the Q consecutive second results as the second result used as the reference, where the Q second results belong to the multiple second results and the $q^{th}$ first result of the Q first results corresponds to the $q^{th}$ second result of the Q second results, where $1 \leq q \leq Q$ and both q and Q are integers.

With reference to the sixth aspect, in a fourth possible implementation manner, a time of the first network device is synchronized with a time of the second network device;

the receiving unit is further configured to receive multiple first result groups sequentially sent by the first network device and multiple second result groups sequentially sent by the second network device, where one first result group includes an identifier of one period and first results corresponding to one or more groups of packets obtained by the first network device through statistics collection within the period, and one second result group includes an identifier of one period and second results corresponding to one group or multiple groups of packets obtained by the second network device through statistics collection within the period; and the determining unit is further configured to determine, according to the multiple first result groups and the multiple second result groups, whether a packet in the packets sent by the first network device to the second network device is lost.

With reference to the fourth possible implementation manner of the sixth aspect, in a fifth possible implementation manner, the determining unit is specifically configured to:

compare a first result in a first result group with a corresponding second result in a second result group, where the first result group and the second result group have an identifier of a same period, and when any comparison result indicates that a first result is different from a second result, determine that a packet in the packets sent by the first network device to the second network device is lost, where when either quantities or section identifiers included in a first result and a second result that are compared are different, the comparison result indicates that the first result is different from the second result; and the $p^{th}$ first result in the first result group corresponds to the $p^{th}$ second result in the second result group, where $p \geq 1$ and p is an integer.

With reference to the sixth aspect, or any one of the first to the third possible implementation manners of the sixth aspect, in a sixth possible implementation manner, the controller further includes: an execution unit, configured to: when the section identifier is values of multiple bits of an Identifier field in a packet header, sequence, the multiple second results, so that section identifiers of the sequenced multiple second results are in ascending order, where the determining unit is further configured to determine, according to the multiple first results and the sequenced multiple second results, whether a packet in the packets sent by the first network device to the second network device is lost.

According to a seventh aspect, a packet loss detection system is provided, including any network device provided in the fourth aspect, any network device provided in the fifth aspect, and any controller provided in the sixth aspect.

In the packet loss detection method, the apparatus, and the system that are provided in the embodiments of the present disclosure, a controller may compare received first results sequentially sent by a first network device and received second results sequentially sent by a second network device, and determine whether a packet in packets sent by the first network device to the second network device is lost. Compared with the prior art, in the method provided in the embodiments of the present disclosure, the first results and the second results do not need to be sent on a data link between network devices, and even if the first results and the second results need to be sent on the data link, a sequence between the packets and the first results or between the packets and the second results does not need to be ensured; therefore, implementation is relatively simple, and the method can be applied between most network devices.

BRIEF DESCRIPTION OF DRAWINGS

To describe the technical solutions in the embodiments of the present disclosure or in the prior art more clearly, the following briefly describes the accompanying drawings required for describing the embodiments or the prior art.

FIG. 1 is a schematic diagram of an IP service stream sent by a network device in the prior art;

FIG. 2 is a network architectural diagram of a packet loss detection system according to an embodiment of the present disclosure;

FIG. 3 is a flowchart of a packet loss detection method according to an embodiment of the present disclosure;

DESCRIPTION OF EMBODIMENTS

Figure 4:
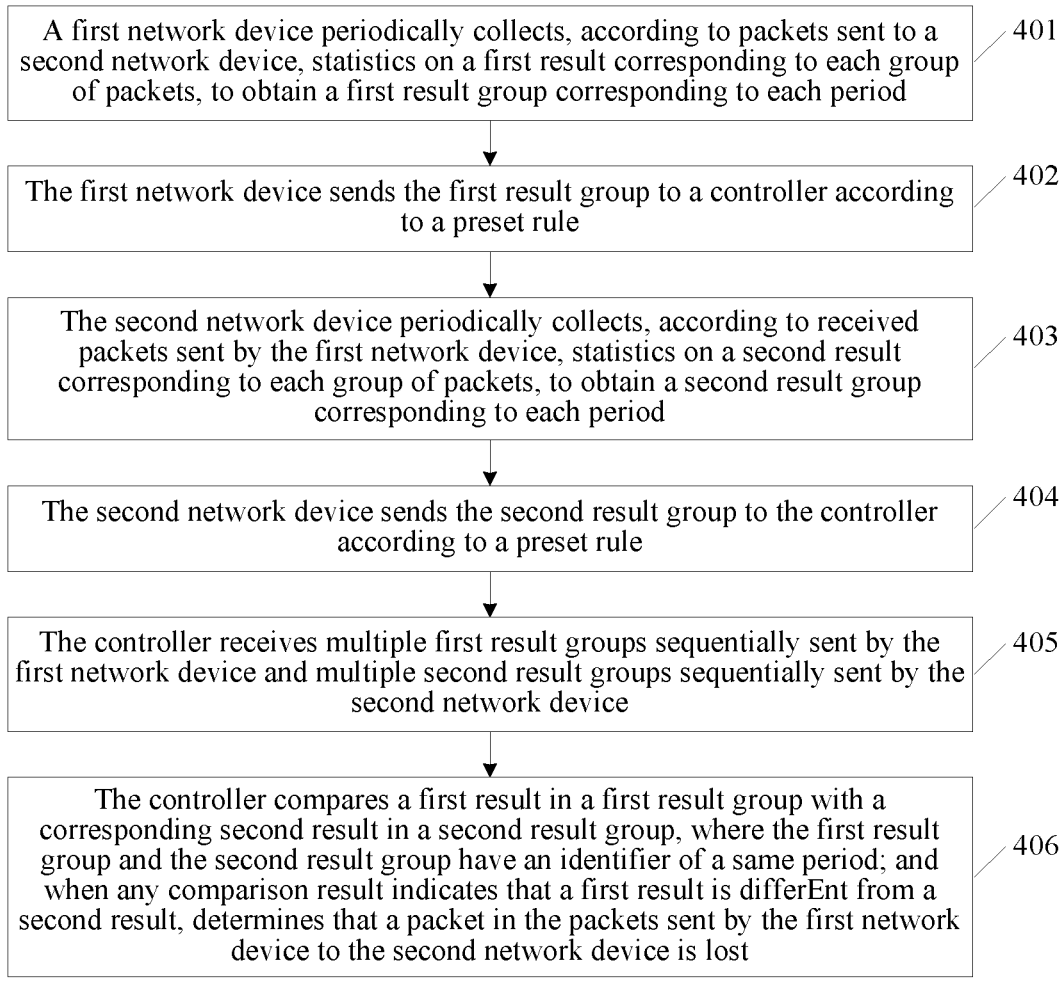
FIG. 4 is a flowchart of another packet loss detection method according to an embodiment of the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In addition, in the embodiments of the present disclosure, an adjacent base station of a base station refers to a base station whose coverage is adjacent to coverage of the base station. The term "and/or" in this specification describes only an association relationship for describing associated objects and represents that three relationships may exist. For example, A and/or B may represent the following three cases: Only A exists, both A and B exist, and only B exists. "Multiple" in this specification refers to two or more than two.

FIG. 2 is a network architectural diagram of a packet loss detection system. The system includes a first network device, a second network device, and a controller. Both the first network device and the second network device may communicate with the controller, and the first network device may send packets to the second network device through a data link connecting the first network device and the second network device. Meanwhile, there may be another network device between the first network device and the second network device. Specifically, the first network device and the second network device may be devices such as routers or switches, and the controller may be a device such as a network manager or a network controller. When the first network device (the second network device) has an integrated control function, the controller may be the first network device (the second network device).

An embodiment of the present disclosure provides a packet loss detection method. As shown in FIG. 3, the method includes:

301: A first network device collects, according to packets sent to a second network device, statistics on a first result corresponding to each group of packets.

One first result includes a quantity of packets in one group of packets and a section identifier of the group of packets, each group of packets includes multiple packets, and the multiple packets are continuously sent by the first network device and belong to a section corresponding to a section identifier of the group of packets.

The method provided in this embodiment of the present disclosure may be applied to a network system, and may be specifically applied to an IP network system, to determine whether a packet in packets transmitted between network devices is lost.

A method for determining a packet section may be configured for the network device. The network device determines, according to the method, which section a packet is in. Specifically, the network device may determine, according to Identifier fields in packet headers of packets, whether two packets are in a same section. In this case, optionally, packets whose Identifier (identifier) fields in packet headers are in a same numerical value range or whose at least one bit in Identifier fields in packet headers share a same value belong to a same section.

For example, an Identifier field in a packet header of an IP packet includes 16 bits. Exemplarily, a value range 0-65535 of the Identifier field is divided into 16 numerical ranges, that is, 16 sections, where the 16 sections are respectively 0-4095, 4096-8191, . . . , 61440-65535. The network device may determine, according to a value of an Identifier field in a to-be-sent packet, which section the packet belongs to.

In this case, a section identifier may be represented by using a number, for example, the 16 section identifiers in the foregoing example may be 16 values when four higher bits of the Identifier fields are respectively 0000-1111, where a section identifier 0000 corresponds to a section 0-4095, a section identifier 0001 corresponds to a section 4096-8191, . . . , a section identifier 1111 corresponds to a section 61440-65535.

Specifically, when packets whose at least one bit in Identifier fields in packet headers share a same value belong to a same section, a section identifier may be represented directly by using the value of the at least one bit. The following describes, by using this case as an example, the method provided in this embodiment of the present disclosure.

For example, for brief description and for the convenience of understanding, the method is described by using an example in which an Identifier field in a packet header includes four bits. If the first network device sequentially sends 12 packets (marked as a packet 1 to a packet 12), Identifier fields of the packet 1 to the packet 12 are respectively 0000, 0010, 0100, 0101, 0110, 0111, 1001, 1010, 1011, 1100, 1101, and 1111. When the first network device determines, by using a value of bit (bit) 2 (the third bit in ascending order), which section a packet belongs to, a section identifier may be the value of bit 2 (that is, there are two section identifiers, namely, 0 and 1). Packets whose bit 2 in the Identifier fields are 0 are in a section, and packets whose bit 2 in Identifier fields are 1 are in a section. The first network device divides, according to a rule that packets in each group belong to a same section and are continuously sent by the first network device (that is, when a packet and a previous packet belong to different sections, the packet is used as the first packet of a new packet group, and packets in each group of packets are continuously sent and belong to a section corresponding to a section identifier of the group of packets), 12 packets into four groups of packets, namely:

<u>0000, 0010,</u> <u>0100, 0101, 0110, 0111,</u> <u>1001, 1010, 1011,</u> and
  First group       Second group       Third group <u>1100, 1101, 1111.</u>
  Fourth group Based on the foregoing example, the first network device may sequentially obtain, through statistics collection, 4 first results corresponding to four groups of packets, which are specifically shown in Table 1.

TABLE 1

1.

| | First result | |
|---|---|---|
| Number of a first result | Section identifier of a group of packets corresponding to a first result | Quantity of packets in a group of packets corresponding to a first result |
| 1 | 0 | 2 |
| 2 | 1 | 4 |
| 3 | 0 | 3 |
| 4 | 1 | 3 |

302: The first network device sends the first result corresponding to each group of packets to a controller according to a preset rule.

The preset rule may be a sequence of times of collecting statistics on the first results.

Specifically, the first network device may send a first result to the controller immediately after the first network device obtains the first result through statistics collection, or may send a preset quantity of first results to the controller immediately after the first network device obtains the preset quantity of first results through statistics collection, which is not limited in this embodiment of the present disclosure.

Certainly, the preset rule may be another rule, which may be specifically determined according to an actual application scenario, and is not specifically limited in this embodiment of the present disclosure.

303: The second network device collects, according to the received packets sent by the first network device, statistics on a second result corresponding to each group of packets.

One second result includes a quantity of packets in one group of packets and a section identifier of the group of packets, each group of packets includes multiple packets, and the multiple packets are continuously received by the second network device and belong to a section corresponding to a section identifier of the group of packets.

During specific implementation, a same method for determining a packet section is preset in the first network device and the second network device.

It should be noted that, when a moment when the first network device starts collecting statistics on a first result is the same as a moment when the second network device starts collecting statistics on a second result, if there is a packet being transmitted between the first network device and the second network device, a quantity of second results obtained by the second network device through statistics collection may be greater than a quantity of first results obtained by the first network device through statistics collection.

Based on the example described in Table 1, if the first network device starts collecting statistics on the first result when the first network device is to send a packet 1, the first results shown in Table 1 may be obtained. In this case, in a case in which bit 2 of two adjacent packets being transmitted between the first network device and the second network device are 1 in, no packet is lost, and no disorder exists, second results obtained by the second network device through statistics collection are shown in Table 2.

TABLE 2

2.

| | Second result | |
|---|---|---|
| Number of a second result | Section identifier of a group of packets corresponding to a second result | Quantity of packets in a group of packets corresponding to a second result |
| 1 | 1 | 2 |
| 2 | 0 | 2 |
| 3 | 1 | 4 |
| 4 | 0 | 3 |
| 5 | 1 | 3 |

In Table 1 and Table 2, the $i^{th}$ first result in Table 1 and the $(i+1)^{th}$ second result in Table 2 correspond to a same group of packets, where $1 \leq i \leq 4$ and i is an integer.

304: The second network device sends the second result corresponding to each group of packets to the controller according to a preset rule.

The preset rule may be a sequence of times of collecting statistics on the second results.

Preferably, the preset rule in the first network device is the same as the preset rule in the second network device, for example, when the first network device sends a preset quantity of first results to the controller immediately after the first network device obtains the preset quantity of first results through statistics collection, the second network device also sends a preset quantity of second results to the controller immediately after the second network device obtains the preset quantity of second results through statistics collection.

305: The controller receives multiple first results sequentially sent by the first network device and multiple second results sequentially sent by the second network device.

Specifically, based on the example described in Table 1, after the controller receives first results corresponding to four groups of packets obtained by the first network device through statistics collection, the controller may receive the first results shown in Table 1. In this case, based on the example described in Table 2, after the controller receives second results corresponding to five groups of packets obtained by the second network device through statistics collection, the controller may receive the second results shown in Table 2.

306: The controller determines, according to the multiple first results and the multiple second results, whether a packet in the packets sent by the first network device to the second network device is lost.

Specifically, when the controller determines that a packet in the packets sent by the first network device to the second network device is lost, the controller may notify a network maintenance person through indication information, so that the network maintenance person maintains the network.

Optionally, step 306 may be specifically implemented through the following step 11) and step 12):

11) The controller determines a first result used as a reference and a second result used as a reference, where the first result used as the reference and the second result used as the reference correspond to a same group of packets.

12) The controller compares the sequentially received multiple first results started from the first result used as the reference with the sequentially received multiple second results started from the second result used as the reference, and when quantities of packets included in a first result and a second result that correspond to a same group of packets are different, determines that a packet in the packets sent by the first network device to the second network device is lost.

Exemplarily, as shown in Table 1 and Table 2, the first result used as the reference may be the $1^{st}$ first result in Table 1 and the second result used as the reference may be the $2^{nd}$ second result in Table 2. If a packet is lost in a process of transmission between the first network device and the second network device, quantities included in a first result and a second result that correspond to a same group of packets are different; therefore, it may be determined through this feature whether a packet sent by the first network device to the second network device is lost.

Optionally, during specific implementation, step 11) may be: comparing, by the controller, Q consecutive first results with multiple second results, and when each first result of the Q consecutive first results is the same as a corresponding second result of Q consecutive second results, determining, by the controller, the last one of the Q consecutive first results as the first result used as the reference and determining the last one of the Q consecutive second results as the second result used as the reference, where the Q second results belong to the multiple second results and the CO first result of the Q first results corresponds to the $q^{th}$ second result of the Q second results, where $1 \leq q \leq Q$ and both q and Q are integers.

Specifically, to improve accuracy of the determined first result used as the reference and the determined second result used as the reference, preferably, Q is greater than 1.

Exemplarily, after receiving the first results in Table 1 and the second results in Table 2, the controller may compare two consecutive first results in Table 1 with two consecutive second results in Table 2; and if a comparison result indicates that the first results are the same as the second results, the controller determines the $2^{nd}$ first result in the two consecutive first results as the first result used as the reference and the $2^{nd}$ second result in the two consecutive second results as the second result used as the reference. For example, if the two consecutive first results are the $2^{nd}$ and $3^{rd}$ first results in Table 1, when the controller compares the $2^{nd}$ and the $3^{rd}$ first results with two consecutive second results in Table 2, the controller starts comparison from the first two consecutive second results in Table 2, and after three times of comparisons, because a comparison result of comparing the $2^{nd}$ and $3^{rd}$ first results with the $3^{rd}$ and $4^{th}$ second results indicates that the first results are the same as the second results, the controller determines the $3^{rd}$ first result in Table 1 as the first result used as the reference and the $4^{th}$ second result in Table 2 as the second result used as the reference.

Optionally, before step 306, the method may further include: when the section identifier is values of multiple bits of an Identifier field in a packet header, sequencing, by the controller, multiple second results, so that section identifiers of the sequenced multiple second results are in ascending order after sequencing. In this case, step 306 may be specifically implemented as: determining, by the controller according to the multiple first results and the sequenced multiple second results, whether a packet in the packets sent by the first network device to the second network device is lost.

In this case, the packet may be an IP service packet in a same service stream. In an IP network, values of Identifier fields in multiple IP service packets in a same service stream sent by the network device are in ascending order in a numerical range of 0-65535. Specifically, because disorder may happen when the IP service packets are transmitted on a data link, in this case, an error may occur in a result of determining, by the controller, whether a packet in the IP service packets sent by the first network device to the second network device is lost.

Therefore, in an optional method, in a process in which values of Identifier fields in multiple IP service packets in a same service stream are in ascending order in the numerical range of 0-65535, after the controller receives the second result sent by the second network device, because values of multiple bits in the Identifier fields in multiple IP service packets continuously sent by the first network device are in ascending order, the second network device may sequence the second results according to the feature, and determine whether a packet in the IP service packets sent by the first network device to the second network device is lost. In this case, even if disorder happens in IP service packets in a same service stream, after the controller sequences the received second results, the controller may still determine whether a packet transmitted between network devices is lost.

However, in the method, in the background, for detecting whether an IP service packet is lost, once disorder happens between a statistics collection packet and an IP service packet, an error may occur in a determining result.

In addition, when the controller receives network fault information reported by a user, or needs to detect quality of a network, the controller may send a detection instruction to the first network device and the second network device, and after the first network device receives the detection instruction sent by the controller, the first network device starts collecting statistics on a first result.

Specifically, during specific implementation, step 301 may be:

1) After the first network device receives the detection instruction sent by the controller, the first network device starts a counter, and when determining to send the first packet, adds one to the counter.

2) When the first network device determines to send the second packet, the first network device determines a value of a specific bit of an Identifier field in the second packet; and if the value of the specific bit of the Identifier field in the second packet is the same as a value of a specific bit of an Identifier field in the first packet, adds one to the counter; or if the value of the specific bit of the Identifier field in the second packet is different from a value of a specific bit of an Identifier field in the first packet, records the value (that is, a section identifier) of the specific bit of the Identifier field in the first packet and a counting result of the counter at this moment, and after obtaining the $1^{st}$ first result, initializes the counter to 1. The specific bit may be one or more bits of the Identifier field. When it is determined to send a next packet, the foregoing step 2) is repeated.

Step 301 may be implemented in another manner. For example, based on the example shown in Table 1, after receiving the detection instruction sent by the controller, the first network device does not collect statistics on packets immediately, but starts statistics collection after a value of bit 2 is switched between 0 and 1. This embodiment of the present disclosure merely shows one implementation manner, rather than limiting step 301.

Specifically, the foregoing method may be used as a method for collecting, by the second network device, statistics on a second result.

In the packet loss detection method provided in this embodiment of the present disclosure, a controller may compare received first results sequentially sent by a first network device with received second results sequentially sent by a second network device, and determine whether a packet in packets sent by the first network device to the second network device is lost. Compared with the prior art, in the method provided in this embodiment of the present disclosure, the first results and the second results do not need to be sent on a data link between network devices, and even if the first results and the second results need to be sent on the data link, a sequence between the packets and the first results or between the packets and the second results does not need to be ensured; therefore, implementation is relatively simple, and the method can be applied between most network devices.

An embodiment of the present disclosure further provides a packet loss detection method. As shown in FIG. 4, the method includes:

401: A first network device periodically collects, according to packets sent to a second network device, statistics on a first result corresponding to each group of packets, to obtain a first result group corresponding to each period.

One first result group includes an identifier of one period and first results corresponding to one or more groups of packets obtained by the first network device through statistics collection within the period.

Specifically, based on the example in Table 1, if the first network device sends, within a period $T_1$, packets whose Identifier fields are respectively 0000, 0010, 0100, and 0101, packets sent by the first network device within the period $T_1$ are divided into two groups of packets, namely, $$\underline{0000, 0010}_{\text{First group}} \text{ and } \underline{0100, 0101}_{\text{Second group}}.$$

If the first network device sends, within a period $T_2$, packets whose Identifier fields are respectively 0110, 0111, 1001, and 1010, packets sent by the first network within the period $T_2$ are divided into two groups of packets, namely, $$\underline{0110, 0111}_{\text{First group}} \text{ and } \underline{1001, 1010}_{\text{Second group}}.$$

If the first network device sends, within a period $T_3$, packets whose Identifier fields are respectively 1011, 1100, 1101, and 1111, packets sent by the first network within the period $T_3$ are divided into two groups of packets, namely, $$\underline{1011}_{\text{First group}} \text{ and } \underline{1100, 1101, 1111}_{\text{Second group}}.$$

The first network device may obtain the first result group in Table 3 through statistics collection.

TABLE 3

| Period identifier | Number of a first result group | First result | | |
|---|---|---|---|---|
| | | Number of a first result in a first result group | Section identifier of a group of packets corresponding to a first result | Quantity of packets in a group of packets corresponding to a first result |
| $T_1$ | 1 | 1 | 0 | 2 |
| | | 2 | 1 | 2 |
| $T_2$ | 2 | 1 | 1 | 2 |

TABLE 3-continued

| Period identifier | Number of a first result group | First result | | |
|---|---|---|---|---|
| | | Number of a first result in a first result group | Section identifier of a group of packets corresponding to a first result | Quantity of packets in a group of packets corresponding to a first result |
| $T_3$ | 3 | 2 | 0 | 2 |
| | | 1 | 0 | 1 |
| | | 2 | 1 | 3 |

402: The first network device sends the first result group to a controller according to a preset rule.

The preset rule may be a sequence of times of collecting statistics on the first result groups.

Specifically, the first network device may send a first result group to the controller immediately after the first network device obtains the first result group through statistics collection, or may send a preset quantity of first result groups to the controller immediately after the first network device obtains the preset quantity of first result groups through statistics collection, which is not limited in this embodiment of the present disclosure.

403: The second network device periodically collects, according to received packets sent by the first network device, statistics on a second result corresponding to each group of packets, to obtain a second result group corresponding to each period.

One second result group includes an identifier of one period and second results corresponding to one or more groups of packets obtained by the second network device through statistics collection within the period.

A start moment of $T_j$ of the first network device is different from a start moment of $T_j$ of the second network device, and specifically, the start moments may differ by one time period, where the time period may be a transmission delay of a data link between the first network device and the second network device. Because a time of the first network device is synchronized with a time of the second network device, a second result group that is obtained by the second network device through statistics collection within the period $T_j$ of the second network device is a second result group that is obtained through statistics collection according to packets that are sent by the first network device within the $T_j$ of the first network device, where $j \geq 1$ and j is an integer.

Specifically, in a case in which a packet transmitted between the first network device and the second network device is not lost and no disorder happens, the second network device may obtain a same second result group as data in Table 3.

404: The second network device sends the second result group to the controller according to a preset rule.

The preset rule may be a sequence of times of collecting statistics on the second result groups.

Preferably, the preset rule in the first network device is the same as the preset rule in the second network device, for example, when the first network device sends a preset quantity of first result groups to the controller immediately after the first network device obtains the preset quantity of first result groups through statistics collection, the second network device also sends a preset quantity of second result groups to the controller immediately after the second network device obtains the preset quantity of second result groups through statistics collection.

405: The controller receives multiple first result groups sequentially sent by the first network device and multiple second result groups sequentially sent by the second network device.

406: The controller compares a first result in a first result group with a corresponding second result in a second result group, where the first result group and the second result group have an identifier of a same period; and when any comparison result indicates that a first result is different from a second result, determines that a packet in the packets sent by the first network device to the second network device is lost.

When either quantities or section identifiers included in a first result and a second result that are compared are different, the comparison result indicates that the first result is different from the second result. The $p^{th}$ first result in the first result group corresponds to the $p^{th}$ second result in the second result group, where $p \geq 1$ and p is an integer.

During specific implementation, in an optional method, because a packet sent by the first network device within the period $T_j$ of the first network device is received by the second network device within the period $T_j$ of the second network device, the controller may directly compare a first result in a first result group with a second result in a second result group, and determine whether a packet is lost, and does not need to determine a first result used as a reference and a second result used as a reference, where the first result group and the second result group have an identifier of a same period.

In this embodiment, when the packet is an IP service packet, after the controller receives the second result group, the controller may sequence the second results in the second result group before performing step 406.

In addition, in the foregoing embodiment, the network device may determine, by determining services corresponding to packets, whether two packets are in a same section, for example, packets corresponding to a same service are located in a same section, or the network device may determine, by determining types of packets, whether the two packets are in a same section, for example, packets having a same packet type are in a same section.

In the packet loss detection method provided in this embodiment of the present disclosure, a controller receives first result groups sequentially sent by a first network device and second result groups sequentially sent by a second network device, and compare a received first result group with a received second result group that have an identifier of a same period, so that the controller may rapidly determine whether a packet in packets sent by the first network device to the second network device is lost. Compared with the prior art, in the method provided in this embodiment of the present disclosure, the first result groups and the second result groups do not need to be sent on a data link between network devices, and even if the first result groups and the second result groups need to be sent on the data link, a sequence between the packets and the first result groups or between the packets and the second result groups does not need to be ensured; therefore, implementation is relatively simple, and the method can be applied between most network devices.

Figure 5:
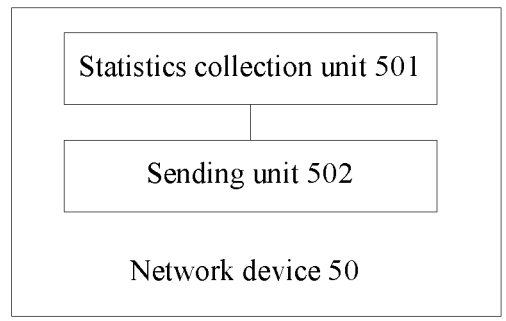
FIG. 5 is a schematic structural diagram of a network device according to an embodiment of the present disclosure.

An embodiment of the present disclosure provides a network device 50. The network device may be a first network device in the packet loss detection method shown in FIG. 3 or FIG. 4. As shown in FIG. 5, the network device 50 includes:

a statistics collection unit 501, configured to collect, according to packets sent to another network device, statistics on a first result corresponding to each group of packets, where one first result includes a quantity of packets in one group of packets and a section identifier of the group of packets, each group of packets includes multiple packets, and the multiple packets are continuously sent by the network device and belong to a section corresponding to a section identifier of the group of packets; and a sending unit 502, configured to send the first result corresponding to each group of packets to a controller according to a preset rule, so that the controller determines whether a packet in the packets sent by the network device to the another network device is lost.

Optionally, packets whose Identifier fields in packet headers fall within a same numerical range or packets whose at least one bit in Identifier fields in packet headers share a same value belong to a same section.

Optionally, a time of the network device is synchronized with a time of the another network device; the statistics collection unit 501 is further configured to periodically collect, according to the packets sent to the another network device, statistics on the first result corresponding to each group of packets, to obtain a first result group corresponding to each period, where one first result group includes an identifier of one period and first results corresponding to one or more groups of packets obtained by the network device through statistics collection within the period; and the sending unit 502 is further configured to send the first result group to the controller according to the preset rule.

The network device provided in this embodiment of the present disclosure may send a first result obtained through statistics collection to a controller, and the controller may compare sequentially received first results with second results sent by another network device, and determine whether a packet in packets sent by the network device to the another network device is lost. Compared with the prior art, in the technical solution provided in this embodiment of the present disclosure, the first results and the second results do not need to be sent on a data link between network devices, and even if the first results and the second results need to be sent on the data link, a sequence between the packets and the first results or between the packets and the second results does not need to be ensured; therefore, implementation is relatively simple, and the technical solution can be applied between most network devices.

In hardware implementation, units of the network device 50 may be embedded in or independent of a processor of the network device 50 in a hardware form, or may be stored in a memory of the network device 50 in a software form, so that the processor performs invoking to execute the operations corresponding to the units, where the processor may be a central processing unit (CPU), a microprocessor, a single-chip microcomputer, or the like.

Figure 6:
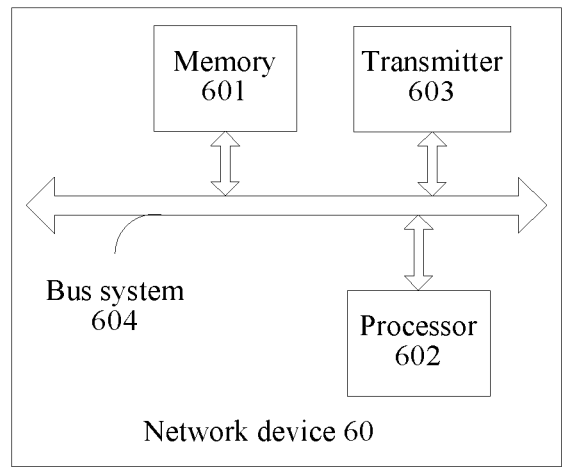
FIG. 6 is a schematic structural diagram of another network device according to an embodiment of the present disclosure.

As shown in FIG. 6, an embodiment of the present disclosure provides another network device 60. The network device may be a first network device in the packet loss detection method shown in FIG. 3 or FIG. 4. The network device 60 includes a memory 601, a processor 602, a transmitter 603, and a bus system 604.

The memory 601, the processor 602, and the transmitter 603 are coupled through the bus system 604, where the memory 601 may include a random access memory, or may include a non-volatile memory, for example, at least one magnetic disk memory. The bus system 604 may be an ISA bus, a PCI bus, an EISA bus, or the like. The bus system 604 may be classified into an address bus, a data bus, a control bus, and the like. For ease of illustration, the bus in FIG. 6 is represented by using only one bold line, but it does not mean that there is only one bus or one type of bus.

The memory 601 is configured to store a group of code, where the code is used to control the processor 602 to execute the following actions: collecting, according to packets sent to another network device, statistics on a first result corresponding to each group of packets, where one first result includes a quantity of packets in one group of packets and a section identifier of the group of packets, each group of packets includes multiple packets, and the multiple packets are continuously sent by the network device and belong to a section corresponding to a section identifier of the group of packets; and the transmitter 603 is configured to send the first result corresponding to each group of packets to a controller according to a preset rule, so that the controller determines whether a packet in packets sent by the network device to the another network device is lost.

Optionally, packets whose Identifier fields in packet headers fall within a same numerical range or packets whose at least one bit in identifier fields in packet headers share a same value belong to a same section.

Optionally, a time of the network device is synchronized with a time of the another network device; the processor 602 is further configured to periodically collect, according to the packets sent to the another network device, statistics on the first result corresponding to each group of packets, to obtain a first result group corresponding to each period, where one first result group includes an identifier of one period and first results corresponding to one or more groups of packets obtained by the network device through statistics collection within the period; and the transmitter 603 is further configured to send the first result group to the controller according to the preset rule.

The network device provided in this embodiment of the present disclosure may send a first result obtained through statistics collection to a controller, and the controller may compare sequentially received first results with second results sent by another network device, and determine whether a packet in packets sent by the network device to the another network device is lost. Compared with the prior art, in the technical solution provided in this embodiment of the present disclosure, the first results and the second results do not need to be sent on a data link between network devices, and even if the first results and the second results need to be sent on the data link, a sequence between the packets and the first results or between the packets and the second results does not need to be ensured; therefore, implementation is relatively simple, and the technical solution can be applied between most network devices.

Figure 7:
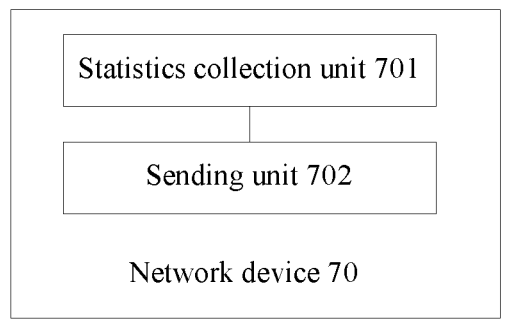
FIG. 7 is a schematic structural diagram of a network device according to an embodiment of the present disclosure.

An embodiment of the present disclosure provides another network device 70. The network device may be a second network device in the packet loss detection method shown in FIG. 3 or FIG. 4. As shown in FIG. 7, the network device 70 includes:

a statistics collection unit 701, configured to collect, according to received packets sent by another network device, statistics on a second result corresponding to each group of packets, where one second result includes a quantity of packets in one group of packets and a section identifier of the group of packets, each group of packets includes multiple packets, and the multiple packets are continuously received by the network device and belong to a section corresponding to a section identifier of the group of packets; and a sending unit 702, configured to send the second result corresponding to each group of packets to a controller according to a preset rule, so that the controller determines whether a packet in the packets sent by the another network device to the network device is lost.

Optionally, packets whose Identifier fields in packet headers fall within a same numerical range or packets whose at least one bit in the Identifier fields in packet headers share a same value belong to a same section.

Optionally, a time of the network device is synchronized with a time of the another network device; the statistics collection unit 701 is further configured to periodically collect, according to the received packets sent by the another network device, statistics on the second result corresponding to each group of packets, to obtain a second result group corresponding to each period, where one second result group includes an identifier of one period and second results corresponding to one or more groups of packets obtained by the network device through statistics collection within the period; and the sending unit 702 is further configured to send the second result group to the controller according to the preset rule.

The network device provided in this embodiment of the present disclosure may send a second result obtained through statistics collection to a controller, and the controller may compare sequentially received second results with first results sent by another network device, and determine whether a packet in packets sent by the another network device to the network device is lost. Compared with the prior art, in the technical solution provided in this embodiment of the present disclosure, the first results and the second results do not need to be sent on a data link between network devices, and even if the first results and the second results need to be sent on the data link, a sequence between the packets and the first results or between the packets and the second results does not need to be ensured; therefore, implementation is relatively simple, and the technical solution can be applied between most network devices.

In hardware implementation, units of the network device 70 may be embedded in or independent of a processor of the network device 70 in a hardware form, or may be stored in a memory of the network device 70 in a software form, so that the processor performs invoking to execute the operations corresponding to the units, where the processor may be a central processing unit (CPU), a microprocessor, a single-chip microcomputer, or the like.

Figure 8:
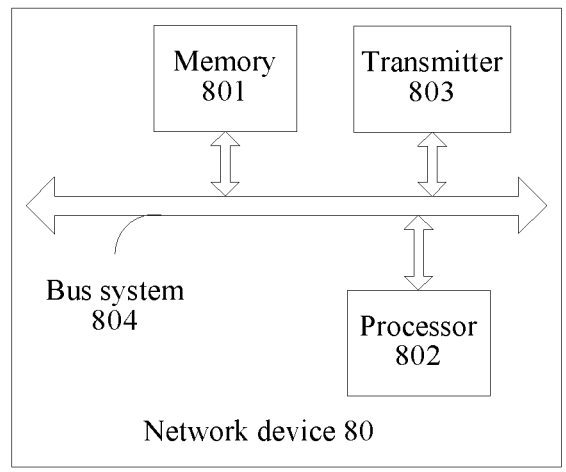
FIG. 8 is a schematic structural diagram of another network device according to an embodiment of the present disclosure.

As shown in FIG. 8, an embodiment of the present disclosure provides another network device 80. The network device may be a second network device in the packet loss detection method shown in FIG. 3 or FIG. 4. The network device 80 includes a memory 801, a processor 802, a transmitter 803, and a bus system 804.

The memory 801, the processor 802, and the transmitter 803 are coupled through the bus system 804, where the memory 801 may include a random access memory, or may include a non-volatile memory, for example, at least one magnetic disk memory. The bus system 804 may be an ISA bus, a PCI bus, an EISA bus, or the like. The bus system 804 may be classified into an address bus, a data bus, a control bus, and the like. For ease of illustration, the bus in FIG. 8 is represented by using only one bold line, but it does not mean that there is only one bus or one type of bus.

The memory 801 is configured to store a group of code, where the code is used to control the processor 802 to execute the following actions: collecting, according to received packets sent by another network device, statistics on a second result corresponding to each group of packets, where one second result includes a quantity of packets in one group of packets and a section identifier of the group of packets, each group of packets includes multiple packets, and the multiple packets are continuously received by the network device and belong to a section corresponding to a section identifier of the group of packets; and the transmitter 803 is configured to send the second result corresponding to each group of packets to a controller according to a preset rule, so that the controller determines whether a packet in the packets sent by the another network device to the network device is lost.

Optionally, packets whose Identifier fields in packet headers fall within a same numerical range or packets whose at least one bit in the Identifier fields in packet headers share a same value belong to a same section.

Optionally, a time of the network device is synchronized with a time of the another network device; the processor 802 is further configured to periodically collect, according to the received packets sent by the another network device, statistics on the second result corresponding to each group of packets, to obtain a second result group corresponding to each period, where one second result group includes an identifier of one period and second results corresponding to one or more groups of packets obtained by the network device through statistics collection within the period; and the transmitter 803 is further configured to send the second result group to the controller according to the preset rule.

The network device provided in this embodiment of the present disclosure may send a second result obtained through statistics collection to a controller, and the controller may compare sequentially received second results with first results sent by another network device, and determine whether a packet in packets sent by the another network device to the network device is lost. Compared with the prior art, in the technical solution provided in this embodiment of the present disclosure, the first results and the second results do not need to be sent on a data link between network devices, and even if the first results and the second results need to be sent on the data link, a sequence between the packets and the first results or between the packets and the second results does not need to be ensured; therefore, implementation is relatively simple, and the technical solution can be applied between most network devices.

Figure 9:
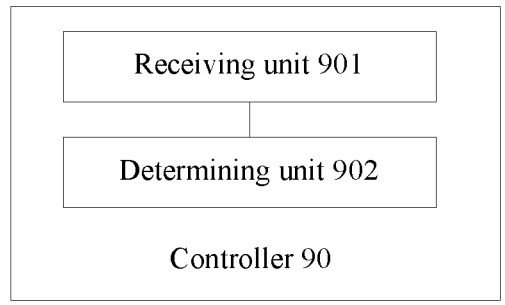
FIG. 9 is a schematic structural diagram of a controller according to an embodiment of the present disclosure.

An embodiment of the present disclosure provides a controller 90, configured to execute the packet loss detection method. As shown in FIG. 9, the controller 90 includes:

a receiving unit 901, configured to receive multiple first results sequentially sent by a first network device and multiple second results sequentially sent by a second network device, where one first result includes a quantity of packets in one group of packets obtained by the first network device through statistics collection according to packets sent to the second network device and includes a section identifier of the group of packets, each group of packets sent by the first network device includes multiple packets that are continuously sent by the first network device and belong to a section corresponding to a section identifier of the group of packets, one second result includes a quantity of packets in one group of packets obtained by the second network device through statistics collection according to the received packets sent by the first network device and includes a section identifier of the group of packets, and each group of packets received by the second network device includes multiple packets that are continuously received by the second network device and belong to a section corresponding to a section identifier of the group of packets; and a determining unit 902, configured to determine, according to the multiple first results and the multiple second results, whether a packet in the packets sent by the first network device to the second network device is lost.

Optionally, packets whose Identifier fields in packet headers fall within a same numerical range or packets whose at least one bit in the Identifier fields in packet headers share a same value belong to a same section.

Figure 10:
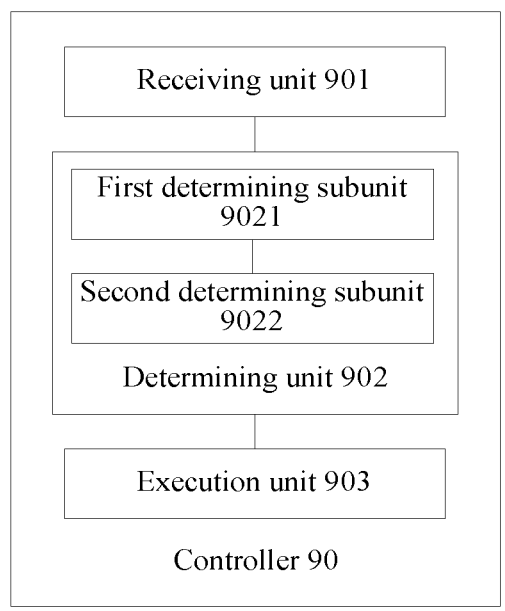
FIG. 10 is a schematic structural diagram of another controller according to an embodiment of the present disclosure.

Optionally, as shown in FIG. 10, the determining unit 902 includes:

a first determining subunit 9021, configured to determine a first result used as a reference and a second result used as a reference, where the first result used as the reference and the second result used as the reference correspond to a same group of packets; and a second determining subunit 9022, configured to compare the sequentially received multiple first results started from the first result used as the reference with the sequentially received multiple second results started from the second result used as the reference, and when quantities of packets included in a first result and a second result that correspond to a same group of packets are different, determine that a packet in the packets sent by the first network device to the second network device is lost.

Optionally, the first determining subunit 9021 is specifically configured to compare Q consecutive first results with multiple second results, and when each first result of the Q consecutive first results is the same as a corresponding second result of Q consecutive second results, determine the last one of the Q consecutive first results as the first result used as the reference and determine the last one of the Q consecutive second results as the second result used as the reference, where the Q second results belong to the multiple second results and the CO first result of the Q first results corresponds to the $q^{th}$ second result of the Q second results, where $1 \leq q \leq Q$ and both q and Q are integers.

Optionally, a time of the first network device is synchronized with a time of the second network device; the receiving unit 901 is further configured to receive multiple first result groups sequentially sent by the first network device and multiple second result groups sequentially sent by the second network device, where one first result group includes an identifier of one period and first results corresponding to one or more groups of packets obtained by the first network device through statistics collection within the period, and one second result group includes an identifier of one period and second results corresponding to one or more groups of packets obtained by the second network device through statistics collection within the period; and the determining unit 902 is further configured to determine, according to the multiple first result groups and the multiple second result groups, whether a packet in the packets sent by the first network device to the second network device is lost.

Optionally, the determining unit 902 is specifically configured to compare a first result in a first result group with a corresponding second result in a second result group, where the first result group and the second result group have an identifier of a same period, and when any comparison result indicates that a first result is different from a second result, determine that a packet in the packets sent by the first network device to the second network device is lost, where when either quantities or section identifiers included in a first result and a second result that are compared are different, the comparison result indicates that the first result is different from the second result; and the $p^{th}$ first result in the first result group corresponds to the $p^{th}$ second result in the second result group, where $p \geq 1$ and p is an integer.

Optionally, as shown in FIG. 10, the controller 90 further includes an execution unit 903, configured to: when the section identifier is values of multiple bits of an Identifier field in a packet header, sequence, multiple second results, so that section identifiers of the sequenced multiple second results are in ascending order; and the determining unit 902 is specifically configured to determine, according to the multiple first results and the sequenced multiple second results, whether a packet in the packets sent by the first network device to the second network device is lost.

The controller provided in this embodiment of the present disclosure may compare received first results sequentially sent by a first network device with received second results sequentially sent by a second network device, and determine whether a packet in packets sent by the first network device to the second network device is lost. Compared with the prior art, in the technical solution provided in this embodiment of the present disclosure, the first results and the second results do not need to be sent on a data link between network devices, and even if the first results and the second results need to be sent on the data link, a sequence between the packets and the first results or between the packets and the second results does not need to be ensured; therefore, implementation is relatively simple, and the technical solution can be applied between most network devices.

In hardware implementation, units of the controller 90 may be embedded in or independent of a processor of the controller 90 in a hardware form, or may be stored in a memory of the controller 90 in a software form, so that the processor performs invoking to execute the operations corresponding to the units, where the processor may be a central processing unit (CPU), a microprocessor, a single-chip microcomputer, or the like.

Figure 11:
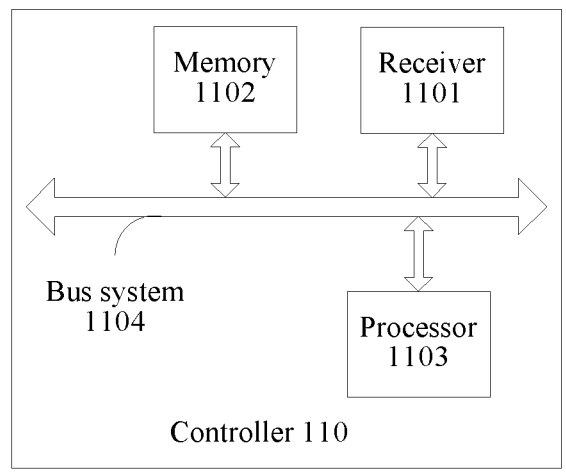
FIG. 11 is a schematic structural diagram of still another controller according to an embodiment of the present disclosure.

As shown in FIG. 11, an embodiment of the present disclosure provides a controller 110, configured to execute the packet loss detection method. The controller 110 includes a receiver 1101, a memory 1102, a processor 1103, and a bus system 1104.

The receiver 1101, the memory 1102, and the processor 1103 are coupled through the bus system 1104, where the memory 1102 include a random access memory, or may include a non-volatile memory, for example, at least one magnetic disk memory. The bus system 1104 may be an ISA bus, a PCI bus, an EISA bus, or the like. The bus system 1104 may be classified into an address bus, a data bus, a control bus, and the like. For ease of illustration, the bus in FIG. 11 is represented by using only one bold line, but it does not mean that there is only one bus or one type of bus.

The receiver 1101 is configured to receive multiple first results sequentially sent by a first network device and multiple second results sequentially sent by a second network device, where one first result includes a quantity of packets in one group of packets obtained by the first network device through statistics collection according to packets sent to the second network device and includes a section identifier of the group of packets, each group of packets sent by the first network device includes multiple packets that are continuously sent by the first network device and belong to a section corresponding to a section identifier of the group of packets, one second result includes a quantity of packets in one group of packets obtained by the second network device through statistics collection according to the received packets sent by the first network device and includes a section identifier of the group of packets, and each group of packets received by the second network device includes multiple packets that are continuously received by the second network device and belong to a section corresponding to a section identifier of the group of packets.

The memory 1102 is configured to store a group of code, where the code is used to control the processor 1103 to execute the following action: determining, according to the multiple first results and the multiple second results, whether a packet in the packets sent by the first network device to the second network device is lost.

Optionally, packets whose Identifier fields in packet headers fall within a same numerical range or packets whose at least one bit in the Identifier fields in packet headers share a same value belong to a same section.

Optionally, the processor 1103 is configured to determine a first result used as a reference and a second result used as a reference, where the first result used as the reference and the second result used as the reference correspond to a same group of packets; compare the sequentially received multiple first results started from the first result used as the reference with the sequentially received multiple second results started from the second result used as the reference, and when quantities of packets included in a first result and a second result that correspond to a same group of packets are different, determine that a packet in the packets sent by the first network device to the second network device is lost.

Optionally, the processor 1103 is specifically configured to compare Q consecutive first results with multiple second results, and when each first result of the Q consecutive first results is the same as a corresponding second result of Q consecutive second results, determine the last one of the Q consecutive first results as the first result used as the reference and determine the last one of the Q consecutive second results as the second result used as the reference, where the Q second results belong to the multiple second results and the $q^{th}$ first result of the Q first results corresponds to the $q^{th}$ second result of the Q second results, where $1 \leq q \leq Q$ and both q and Q are integers.

Optionally, a time of the first network device is synchronized with a time of the second network device; the receiver 1101 is further configured to receive multiple first result groups sequentially sent by the first network device and multiple second result groups sequentially sent by the second network device, where one first result group includes an identifier of one period and first results corresponding to one or more groups of packets obtained by the first network device through statistics collection within the period, and one second result group includes an identifier of one period and second results corresponding to one or more groups of packets obtained by the second network device through statistics collection within the period; and the processor 1103 is further configured to determine, according to the multiple first result groups and the multiple second result groups, whether a packet in the packets sent by the first network device to the second network device is lost.

Optionally, the processor 1103 is specifically configured to compare a first result in a first result group with a corresponding second result in a second result group, where the first result group and the second result group have an identifier of a same period, and when any comparison result indicates that a first result is different from a second result, determine that a packet in the packets sent by the first network device to the second network device is lost, where when either quantities or section identifiers included in a first result and a second result that are compared are different, the comparison result indicates that the first result is different from the second result; and the $p^{th}$ first result in the first result group corresponds to the $p^{th}$ second result in the second result group, where $p \geq 1$ and p is an integer.

Optionally, the processor 1103 is further configured to: when the section identifier is values of multiple bits of an Identifier field in a packet header, sequence, multiple second results, so that section identifiers of the sequenced multiple second results are in ascending order; and determine, according to the first results and the sequenced multiple second results, whether a packet in the packets sent by the first network device to the second network device is lost.

The controller provided in this embodiment of the present disclosure may compare received first results sequentially sent by a first network device with received second results sequentially sent by a second network device, and determine whether a packet in packets sent by the first network device to the second network device is lost. Compared with the prior art, in the technical solution provided in this embodiment of the present disclosure, the first results and the second results do not need to be sent on a data link between network devices, and even if the first results and the second results need to be sent on the data link, a sequence between the packets and the first results or between the packets and the second results does not need to be ensured; therefore, implementation is relatively simple, and the technical solution can be applied between most network devices.

An embodiment of the present disclosure further provides a packet loss detection system, including any network device 50, network device 70, and controller 90 provided in the foregoing embodiments, or any network device 60, network device 80, and controller 110 provided in the foregoing embodiments.

In the several embodiments provided in the present application, it should be understood that the disclosed apparatus and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed.

The modules described as separate parts may or may not be physically separate, and parts displayed as modules may or may not be physical modules, may be located in one position, or may be distributed on a plurality of network units. Some or all of the units may be selected according to actual needs to achieve the objectives of the solutions of the embodiments.

In addition, functional modules in the embodiments of the present disclosure may be integrated into one processing module, or two or more modules are integrated into one module. The integrated module may be implemented in a form of hardware, or may be implemented in a form of hardware in addition to a software functional module.

When the foregoing integrated module is implemented in a form of a software functional module, the integrated unit may be stored in a computer-readable storage medium. The software functional module is stored in a storage medium and includes several instructions for instructing a computer device (which may be a personal computer, a server, or a network device) to perform some of the steps of the methods described in the embodiments of the present disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

The invention claimed is:

1. A controller, comprising:
a receiver, configured to receive multiple first results sent by a first network device and multiple second results sent by a second network device, one first result comprising a quantity of packets in one group of packets obtained by the first network device through statistics collection according to packets sent in a sequential order to the second network device and a section identifier of the group of packets, each group of packets sent by the first network device comprising multiple packets belonging to a section corresponding to a section identifier of the group of packets, one second result comprising a quantity of packets in one group of packets obtained by the second network device through statistics collection according to the received packets sent by the first network device and comprising a section identifier of the group of packets obtained by the second network device, each group of packets received by the second network device comprising multiple packets belonging to a section corresponding to a section identifier of the group of packets, wherein packets that are continuous in the sequential order and having at least one bit with a same value in a same position in packet identifier fields in the IP packet headers belong to a same section, wherein when a packet and a previous packet belong to different sections, the packet is used as a first packet of a next packet group, and the previous packet is part of a first group of packets; and
a processor, configured to:
determine, according to the multiple first results and the multiple second results, whether a packet in the packets sent by the first network device to the second network device has been lost, and
when the section identifier is in the form of values of multiple bits of an identifier field in a packet header, sequence the multiple second results so that section identifiers of the sequenced multiple second results are in ascending order, and determine, according to the multiple first results and the sequenced multiple second results, whether a packet in the packets sent by the first network device to the second network device has been lost.

2. The controller according to claim 1, wherein a packet identifier field of an IP packet header comprises 16 bits.

3. The controller according to claim 1, the processor being configured to determine from received multiple first and second results a first result for use as a first reference and a second result for use as a second reference, wherein the first reference and the second reference correspond to a same group of packets, the controller being configured to compare the received multiple first results started from the first reference with the received multiple second results started from the second reference, and when quantities of packets comprised in a first result and a second result that correspond to a same group of packets are different, determining that a packet in the packets sent by the first network device to the second network device has been lost.

4. The controller according to claim 3, the processor being configured to compare Q consecutive first results with multiple second results, and when each first result of the Q consecutive first results is the same as a corresponding second result of Q consecutive second results, determine the last one of the Q consecutive first results as the first result for use as the first reference and determine the last one of the Q consecutive second results as the second result for use as the second reference, wherein the Q second results belong to the multiple second results and the $q^{th}$ first result of the Q first results corresponds to the $q^{th}$ second result of the Q second results, wherein $1 \leq q \leq Q$ and both q and Q are integers.

5. The controller according to claim 1, the receiver being configured to receive multiple first result groups sent by the first network device and multiple second result groups sent by the second network device, one first result group comprising an identifier of one period and other of the first results corresponding to one or more groups of packets obtained by the first network device through statistics collection within the period, and one second result group comprising an identifier of one period and second results corresponding to one group or multiple groups of packets obtained by the second network device through statistics collection within the period; and the processor being configured to determine, according to the multiple first result groups and the multiple second result groups, whether a packet in the packets sent by the first network device to the second network device has been lost.

6. The controller according to claim 5, the processor being configured to:

compare a first result in a first result group with a corresponding second result in a second result group, the first result group and the second result group each having an identifier of a same period, and when any comparison result indicates that a first result is different from a second result, determine that a packet in the packets sent by the first network device to the second network device has been lost, wherein when either quantities or section identifiers comprised in a first result and a second result that are compared are different, the comparison result indicates that the first result is different from the second result; and the $p^{th}$ first result in the first result group corresponds to the $p^{th}$ second result in the second result group, wherein $p \geq 1$ and p is an integer.

7. A controller, comprising:

a receiver, configured to receive multiple first results sent by a first network device and multiple second results sent by a second network device, one first result comprising a quantity of packets in one group of packets obtained by the first network device through statistics collection according to packets sent to the second network device and a section identifier of the group of packets, each group of packets sent by the first network device comprising multiple packets belonging to a section corresponding to a section identifier of the group of packets, one second result comprising a quantity of packets in one group of packets obtained by the second network device through statistics collection according to the received packets sent by the first network device and comprising a section identifier of the group of packets obtained by the second network device, each group of packets received by the second network device comprising multiple packets belonging to a section corresponding to a section identifier of the group of packets, wherein packets whose identifier fields in Internet Protocol (IP) packet headers fall within a same numerical range or packets whose at least one bit in identifier fields in the IP packet headers share a same value belong to a same section; and a processor, configured to:

determine, according to the multiple first results and the multiple second results, whether a packet in the packets sent by the first network device to the second network device has been lost; and when the section identifier is in the form of values of multiple bits of an identifier field in a packet header, sequence the multiple second results so that section identifiers of the sequenced multiple second results are in ascending order, and determine, according to the multiple first results and the sequenced multiple second results, whether a packet in the packets sent by the first network device to the second network device has been lost.

8. The controller according to claim 7, wherein a packet identifier field of an IP packet header comprises 16 bits.

9. The controller according to claim 7, the processor being configured to determine from received multiple first and second results a first result for use as a first reference and a second result for use as a second reference, wherein the first reference and the second reference correspond to a same group of packets, the controller being configured to compare the received multiple first results started from the first reference with the received multiple second results started from the second reference, and when quantities of packets comprised in a first result and a second result that correspond to a same group of packets are different, determining that a packet in the packets sent by the first network device to the second network device has been lost.

10. The controller according to claim 9, the processor being configured to compare Q consecutive first results with multiple second results, and when each first result of the Q consecutive first results is the same as a corresponding second result of Q consecutive second results, determine the last one of the Q consecutive first results as the first result for use as the first reference and determine the last one of the Q consecutive second results as the second result for use as the second reference, wherein the Q second results belong to the multiple second results and the $q^{th}$ first result of the Q first results corresponds to the $q^{th}$ second result of the Q second results, wherein $1 \leq q \leq Q$ and both q and Q are integers.

11. The controller according to claim 7, the receiver being configured to receive multiple first result groups sent by the first network device and multiple second result groups sent by the second network device, one first result group comprising an identifier of one period and other of the first results corresponding to one or more groups of packets obtained by the first network device through statistics collection within the period, and one second result group comprising an identifier of one period and second results corresponding to one group or multiple groups of packets obtained by the second network device through statistics collection within the period; and the processor being configured to determine, according to the multiple first result groups and the multiple second result groups, whether a packet in the packets sent by the first network device to the second network device has been lost.

12. The controller according to claim 11, the processor being configured to:

compare a first result in a first result group with a corresponding second result in a second result group, the first result group and the second result group each having an identifier of a same period, and when any comparison result indicates that a first result is different from a second result, determine that a packet in the packets sent by the first network device to the second network device has been lost, wherein when either quantities or section identifiers comprised in a first result and a second result that are compared are different, the comparison result indicates that the first result is different from the second result; and the $p^{th}$ first result in the first result group corresponds to the $p^{th}$ second result in the second result group, wherein $p \geq 1$ and p is an integer.

* * * * *